United States Patent [19]

Adams

[11] Patent Number: 4,774,706

[45] Date of Patent: Sep. 27, 1988

[54] PACKET HANDLING COMMUNICATIONS NETWORK

[75] Inventor: John L. Adams, Leiston, England

[73] Assignee: British Telecommunications public limited company, Great Britain

[21] Appl. No.: 924,466

[22] Filed: Oct. 29, 1986

[30] Foreign Application Priority Data

Oct. 29, 1985 [GB] United Kingdom ................. 8526620

[51] Int. Cl.[4] ...................... H04L 11/20; H04L 11/16
[52] U.S. Cl. ......................................... 370/94; 370/86
[58] Field of Search ........................ 340/60, 94, 89, 86, 340/85; 370/61

[56] References Cited

U.S. PATENT DOCUMENTS

| | | | |
|---|---|---|---|
| 4,375,097 | 2/1983 | Ulng | 370/94 |
| 4,408,323 | 10/1983 | Montgomery | 370/60 |
| 4,569,041 | 2/1986 | Takeuchi et al. | 370/86 |
| 4,577,314 | 3/1986 | Chu et al. | 370/94 |

FOREIGN PATENT DOCUMENTS 0119105 9/1984 European Pat. Off. .
2113953 8/1983 United Kingdom .

OTHER PUBLICATIONS

Computer Communications, vol. 4, No. 3, Jun. 1981, pp. 106–126; J. Gruber "Performance considerations for integrated voice and data networks" p. 113, right-hand column, lines 30–40.

Proceedings of the International Switching Symposium, 7th–11th May 1984, Florence, IT, session 42B, paper 3; T. Takeuchi et al.: "Synchronous composite packet switching for ISDN switching system architecture" "Abstract; p. 1, paragraph 2; p. 4, paragraph 4.

Proceedings National Computer Conference, vol. 38, 1971, pp. 211–216, L. R. Tymes: "Tymnet-a terminal oriented communication network" p. 212, left-hand column, line 26; FIG. 2, p. 213; left-hand column, lines 22–34.

Primary Examiner—Douglas W. Olms
Assistant Examiner—Melvin Marcelo
Attorney, Agent, or Firm—Nixon & Vanderhye

[57] ABSTRACT

A communications network has a packet assembler/-disassembler (PAD) 25 accessed from one or more nodes 21. Short delay limits can be met by creating composite packets at the nodes; these carry information for more than one call. Composite packets are transmitted to the PAD, disassembled and reassembled into composite packets each addressed to a single destination node. A call is allocated one or more octets at a given location in packets having a given connection number. Octets are handled by the PAD according to the connection number of their packet and their location in the packet.

15 Claims, 6 Drawing Sheets

COMPOSITE PACKET SWITCHING (a) DEDICATED

|←— SINGLE USER DATAFIELD —→|

(b) COMPOSITE (HOMOGENEOUS)

|←— MANY USER DATAFIELD —→|

(c) COMPOSITE (HETEROGENEOUS)

FIG. 1 SYNCHRONOUS SERVICE PACKET STRUCTURES

FIG. 2 COMPOSITE PACKET SWITCHING

FIG. 3 : PARALLEL PROCESSING ARRANGEMENTS

FIG.4
PACKET DISASSEMBLY

FIG. 5 : PACKET ASSEMBLY

FIG. 6 PAD OPERATION

PACKET HANDLING COMMUNICATIONS NETWORK

BACKGROUND OF THE INVENTION

The present invention relates to communications networks.

Networks providing for the transport of encoded signals on communications links are well known. Examples are packet switching networks, voice and/or data switches, local area networks (LANS) and metropolitan area networks (MANS). The links may be ring- or bus-based and may be adapted to carry speech and/or data. Such networks allow a number of stations or nodes to communicate with each other by way of signal carrying links.

One example of such a network is an integrated switch for carrying voice and other time sensitive signals as well as data. The present applicants' European Patent Application No 85305017.7 describes a ring based network which may be adapted for switching or for use as a LAN.

For public switching applications, propagation delays must be kept short. CCITT Recommendation Q507, for example, states that the mean digital-to-digital one way propagation delay for a digital main network exchange should be 0.45 milliseconds. In the network described in the European application mentioned above, packets are assembled and placed on a ring. Each packet has a 128 bit information field. For 64 kbit/sec speech, the packet assembly time is therefore 2 milliseconds, which is unacceptably long.

There have been proposals to reduce packet assembly time by creating composite packets: see for example "Tymnet—a terminal oriented communication network", L. R. Tymes, Proc NCC Vol 38(1971), pages 211–216 and "Performance considerations for integrated voice and data networks", J. Gruber, Computer Communications, vol 4, no 3, June 1981, pages 106–126. Instead of being devoted to a single user message, the information field of a packet is shared by a number of users. For example, if sixteen 64 kbit/sec voice connections were each to provide an octet of information, packets would take 125 microseconds to assemble, which is an acceptable delay. In addition to reducing the packetisation delay, the voice load is spread more evenly over each 2 millisecond interval than when each voice connection occupies a dedicated packet. Consequently, the maximum time which may be spent waiting for access to the communications link is reduced.

In the system described by Gruber, a composite packet is assembled at an entrance node from waiting data from terminals associated with that node. The composite packet is then forwarded to an exit node, where the packet is disassembled and the data distributed to destination terminals associated with the exit node.

In such a system, if relatively few terminals at an entrance node have data for terminals at an exit node, then partly filled packets would be transmitted between the two nodes, with lower efficiency.

Another proposal for an integrated circuit/packet switching system is disclosed is U.S. Pat. No. 4,569,041 (Takeuchi et al), wherein each node includes a packet assembly/disassembly function and is arranged to assemble composite packets for respective single destination nodes. This system is similar to Gruber and results in low efficiency in use of loop bandwidth where few terminals want to communicate with terminals on a single node.

SUMMARY OF THE INVENTION

The present invention aims to provide a system which can have advantages in terms of efficiency or reduced delays over prior art systems.

The invention provides a communications network comprising interconnected nodes associated with one or more packet assembler and disassemblers (PAD). Composite packets created at nodes can contain information for several destination nodes. These packets are disassembled by the said PADs and the information reassembled into packets containing information for a single destination node.

Thus it is possible for composite packets to contain information for several destination nodes initially, so that packets can be efficiently filled. The packets are subsequently disassembled and the information reassembled into new composite packets containing information from several nodes, all having the same destination node.

More particularly, the present invention provides a communications network comprising a plurality of nodes adapted to transmit and receive packets of information and at least one packet assembler and disassembler, wherein said nodes are adapted to assemble composite packets comprising information for calls for one or more destination nodes and to send the packets via the network to a packet assembler and disassembler for disassembly of the composite packets without requiring packets to be disassembled in any fixed order, reassembly of information into composite packets of information for a single node, and to release those packets for transmission over the network to their destination nodes.

Suitable restrictions may be placed on each node's right to transmit packets so that all nodes have the opportunity to transmit within an acceptable maximum period.

In one form of the invention, each composite packet comprising information for more than one destination node has a packet identifier and information for a call is assembled in a sequence of packets all having the same identifier and at the same location in each packet in the sequence and the packet assembler and disassembler processes packets according to their identifiers, the information in packets being handled according to its location in the packets.

The invention provides a method of transmitting information between interconnected nodes in a communications network, comprising assembling at a node composite packets of information for calls for one or more nodes and sending the packets to a packet assembler and disassembler, over a network which may variably delay each packet, disassembling the information and reassembling in composite packets of information for a single node, and transmitting those packets via the network to their destination nodes.

In a further aspect, the invention provides a packet assembler and disassembler for processing packets of information transmitted from nodes in a communications network, comprising input means for receiving packets transmitted over the network, said packets each containing information for calls for one or more destination nodes, disassembly means for disassembling the packets not in any fixed order, re-assembly means for re-assembling the information into packets containing information for a single destination node and output means for releasing packets for transmission via the network to their respective destination node.

It is to be understood that the invention also encompasses all individual features and combinations of features which are illustrated in the drawings and described in the specification, as well as those specifically mentioned above or claimed in the accompanying claims. Any feature described or illustrated may be present independently or combined with one or more other feature disclosed.

BRIEF DESCRIPTION OF THE DRAWINGS

An embodiment of the invention will now be described, by way of example, with reference to the accompanying diagrammatic drawings in which.

DESCRIPTION OF THE PREFERRED EMBODIMENTS

Figure 1:
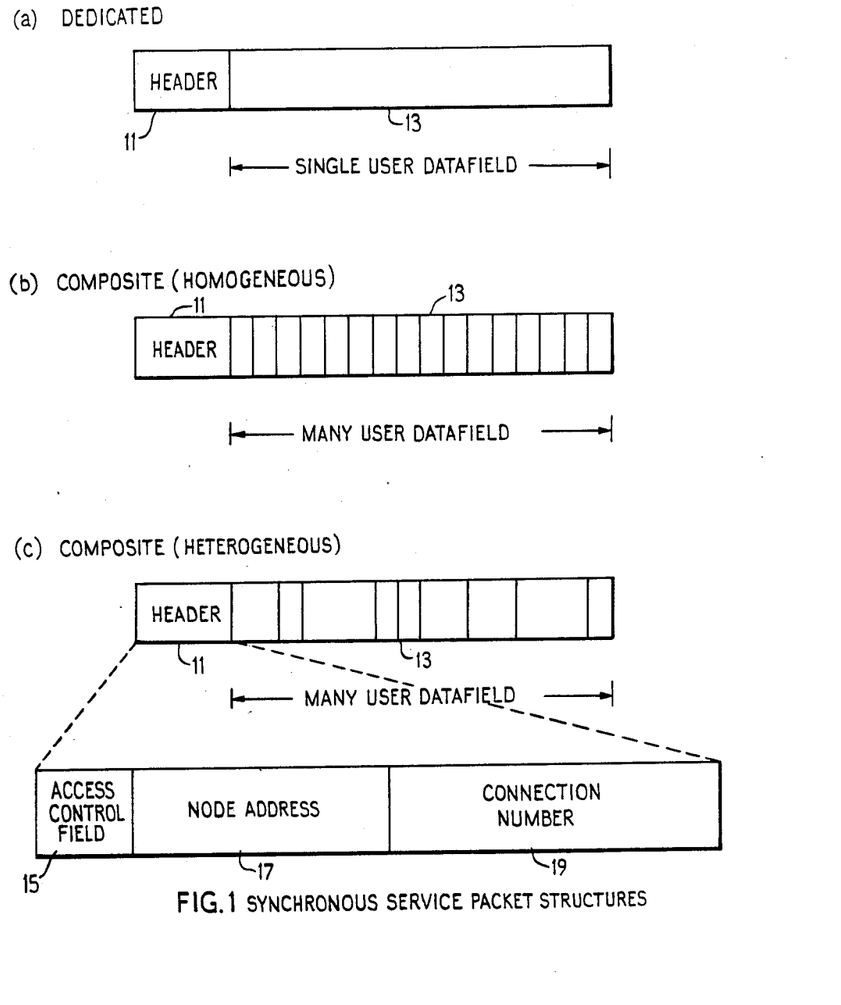
FIG. 1 shows possible dedicated and composite packet structures.

FIG. 1 illustrates three possible packet structures. Each packet has a header 11 and an informaton or data field 13. The header, in all cases, comprises an access control field 15, a destination address portion 17 and a connection number portion 19. FIG. 1(a) shows a dedicated packet in which the data field 13 is devoted to a single call (e.g. data, speech, low bit rate video). For 64 kbit/sec speech, such a packet having a 128 bit field would take 2 milliseconds to assemble. On the other hand, services with a bit rate of 0.5 Mbit/sec would have a packet assembly time of 0.25 milliseconds. FIG. 1(b) shows a homogeneous composite packet where the information field is shared by 16 users all of the same service type. In this case there are sixteen 64 kbit/sec voice connections for several different destination devices each of which is allocated one octet. Packet assembly time is 125 microseconds. FIG. 1(c) shows a heterogeneous composite packet which carries a mix of different services, for example a mixture of speech and low bit-rate video, with the video connection occupying a number of octets, which need not be consecutive. Again, the packet assembly time is short, for example 125 microseconds.

Figure 2:
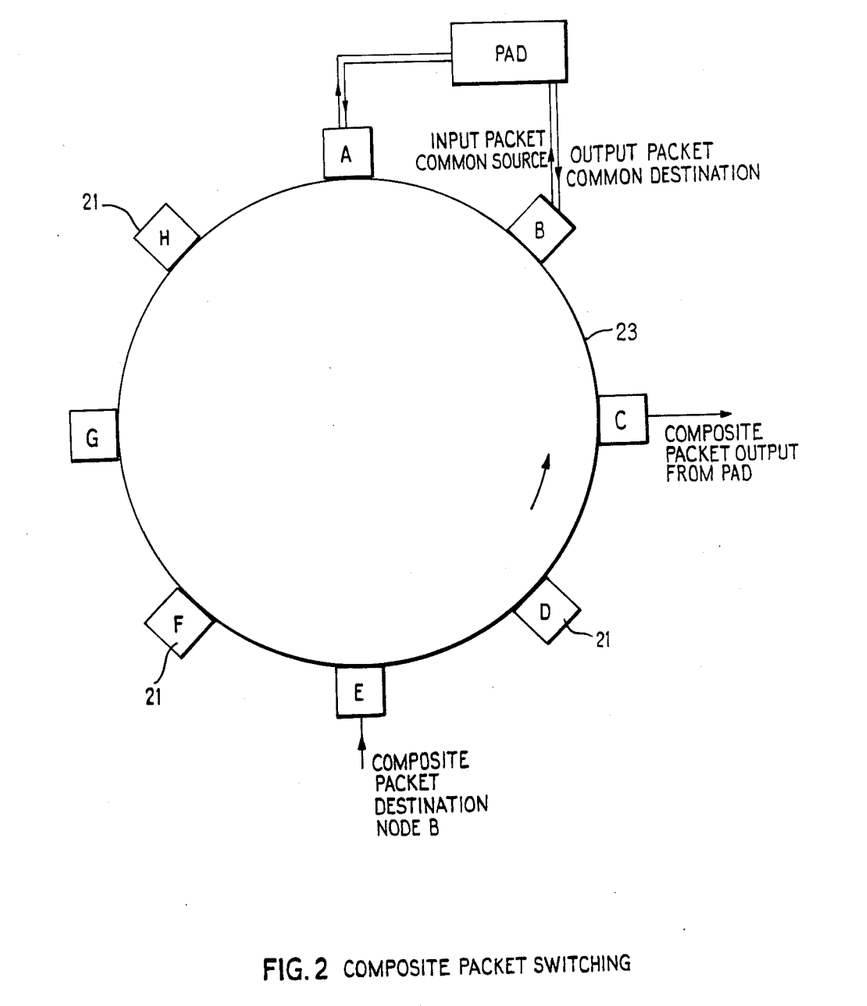
FIG. 2 is a view of a communications system according to one embodiment of the invention.

Referring to FIG. 2, a communications network according to the invention comprises a number of stations or nodes 21 designated A to M which can communicate via a transmission ring or loop 23. Nodes 21 may incorporate many forms of digital based devices such as data processing equipment, video devices, facsimile or telephone equipment and each node may concentrate traffic from several devices. Also, one or more nodes may have access to the public switched telephone network.

The loop is designed to operate according to a slotted ring protocol. One or more slots, each having the same number of bits, circulate around the ring and can be seized by a node which has information to transmit. The ring carries a fixed integer number of slots which are established at switch on and maintained continuously by one node which acts as monitor. The monitor function can be transferred to another node in case of failure.

The embodiment to be described may conveniently use the protocol which is described in European Patent Application No 85305017.7. For detailed information, the reader is referred to that specification, or to "Carrying Integrated Services on the Orwell Slotted Ring" R. M. Falconer and J. L. Adams, Proceedings of the International Seminar on Computer Networking and Performance Evaluation, Tokyo, September 1985. Alternatively different protocols may be used where restrictions are placed on nodes so that they can transmit within fixed maximum delay periods. Briefly, the protocol in the above mentioned application operates such that when a node wishes to transmit data, it is permitted to seize up to a total of d empty packets (which need not be successive) and when it has used that number d it is automatically placed in a state, known as a pause state, in which it is not permitted to seize further packets. The node is only allowed to seize further packets after it has been reset to an active state. If other nodes are waiting to transmit, a reset of the original node cannot take place until the other stations have had an opportunity of using up their d allocations. Each node gets the opportunity to transmit data within a preset maximum period, so that delays are limited.

As shown in FIG. 2, two nodes A and B provide access to a packet assembler/disassembler (PAD) 25. Composite packets as shown in FIG. 1(b) and 1(c) have information for several calls for devices which may be associated with different destination nodes. These packets are sent over the ring 23 from a source node, e.g. node E, to PAD 25 where the information is reassembled into new composite packets which contain information for a common destination node. Thus, composite packets have an initial address of node A or node B allowing the packets to be filled quickly and efficiently, and during the first stage of switching traffic is concentrated towards PAD 25. Following rearrangement at PAD 25, a second link over the ring is required for the newly constituted composite packets with information from several source nodes addressed to a common destination node.

Each node constructs its own packets, addressed to a single destination node. For speech services it will generally be necessary to form composite packets in order to reduce the packetisation delay, as explained above, so that delay requirements can be met. Some local voice services not on the PSTN (e.g. LAN services) may not have such stringent delay requirements and therefore dedicated packets may be sent directly from source to destination node without being switched via PAD 25. Also, services with high bit rates can assemble packets rapidly. For example a 0.5 Mbit/sec service would have a packet assembly time of 0.25 milliseconds and for a single link connection over a ring with a maximum access delay of 0.25 milliseconds the total delay is a maximum of 0.5 milliseconds. These services may therefore also use dedicated packets.

Thus, the ring carries a mixed load of composite and dedicated packets. Composite packets must be addressed initially to one of the access nodes A, B to PAD 25.

Each of the access nodes A, B on the ring 23 includes an access node controller 35. The controllers hold look-up tables listing the connections made via each node, and the tables are updated as each new connection is established. The controllers 35 are also able to assign free channels and, whenever necessary, assign a new connection number, i.e. provide for creation of a new packet sequence. In this example, each access node A,B serves specific source nodes; for example node A may serve nodes F, G and H, and node B may serve nodes C, D and E. In case of failure of one of the access nodes or if one node becomes overloaded, load may be shifted from one node to the other. If a new call from node E, to be switched via PAD 25, is to be set up, that call must be assigned a channel (i.e. a slot or octet or a number of slots or octets) in a sequence of composite packets all having the same identifying connection number. If for a particular connection number the packets generated at node E have a free channel, then the new call can be assigned that channel, and a data message is sent to the access node B giving details of the modified packet, together with the channel identity as described below. However, if all channels on existing composite packets originated by the source node E are fully utilised, a new composite packet must be created. In this case a message is sent by node E to access node B requesting a free connection number for a further composite packet sequence. Provided a free connection number exists in tables held by node B, then a connection number is returned by node B to node E, and at the same time node B updates PAD 25 to accept packets having that identifying connection number. This is described in more detail below. The allocated connection number is carried in portion 19 of the header 11 of the packet from node E and all subsequent related composite packets. Related packets are those handling information on the same set of calls or, as some of those calls are cleared down and new ones are established, on updated sets of calls. Source node E uses the connection number in order to update access node B and PAD 25 with fresh information on the contents of the packet. Thus, on receipt of a new call arrival an appropriate number of octets will be reserved in the information field to accommodate the required bit rate. The position of these octets in the information field will remain fixed for the duration of the call. There is thus effectively an addressing scheme where each user's data are identified by their relative locations in packets of given connection numbers and access node addresses. For a new call, a message is sent to access node B informing it of the destination node for the call, the call itself being identified by the access node address and the connection number of the packet together with the call's position in the information field.

Having established the channel which carries the call to the input side of PAD 25, a free channel must be found on the exit side going to the required destination node. If there is a free channel in an existing sequence of packets which is addressed to the required destination node then that free channel is assigned by the access node to the call. A message is then sent by the access node to the destination node identifying the location of the octets for the new call, i.e. the connection number of the packet sequence and the channel. PAD 25 is also updated with this information as described below. If, on tables held by the appropriate access node, there is no free channel, then a free connection number must be assigned by the access node to establish a new composite packet sequence, and again PAD 25 must be updated with this new connection number as will become clear later. A channel is assigned to the call and a message sent from the access node to the destination node identifying the octets for the new call by connection number and channel.

The access software thus maintains records of all used channels on the entry side of PAD 25 and their associated exit channels, and also of all free channels. Since each access node (A,B) handles data for specific nodes each access node will hold the complete records for any given node.

Once free entry and exit channels have been established and their identities communicated to the calling and called nodes and the PAD, composite packets may be sent to the PAD 25, re-structured and packets sent to the correct destination nodes as explained below.

Figure 3:
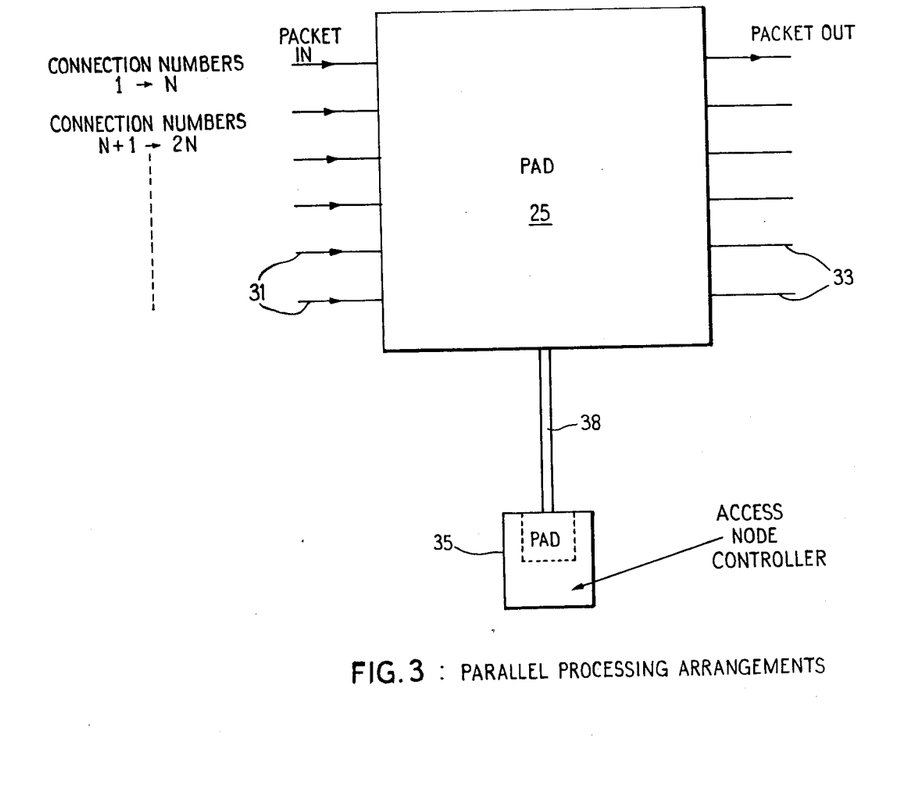
FIGS. 3 to 5 show details of the packet assembler/disassembler (PAD) of the system of FIG. 2.

The structure of PAD 25 is shown in more detail in FIGS. 3 to 6. Referring to FIG. 3, PAD 25 has a number of parallel input lines 31 and output lines 33, and links 38 with access node controllers 35 (only one of which is shown). Each of the input lines is dedicated to handling composite packets within a specified set of connection numbers. One of the characteristics of the network is that packets gain access onto the ring within a maximum period, which in this example is 125 microseconds. Since access is guaranteed only to be within a maximum period, the order in which packets arrive on the input lines is variable. Packets are handled not according to their order of arrival but to their connection number.

Figure 4:
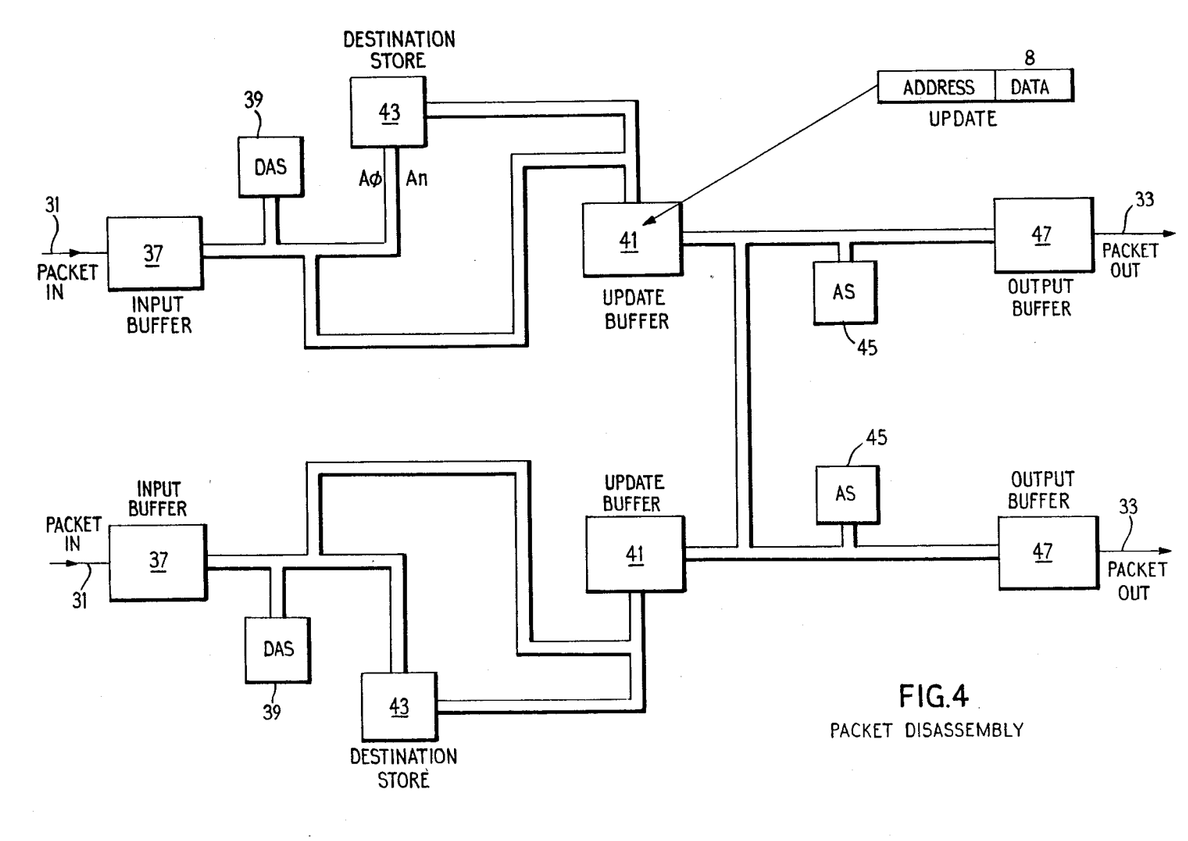

FIG. 4 shows some details of the structure of PAD 25. Each input line 31 delivers packets to a respective input buffer 37 which can store a number of packets on a first-in first-out (FIFO) basis.

Processing of the packets is carried out in two stages because several packets are processed in parallel and the necessary resources may not be available immediately.

In the first stage, packets are disassembled into 'updates' by disassembly logic (DAS) 39 and held in update buffers 41. An 'update' contains an address field and a data field (the latter being a single octet of information). In the second stage, the address information of the updates is used by assembly logic (AS) 45 to load output buffers 47 with the data field of the updates. Each output buffer 47 handles one or more assigned connection numbers at a time.

The first stage is initiated by DAS 39 loading an arriving packet's connection number into a counter in destination store 43. The store 43 holds the destination address for each octet which is contained in the packet identified by the connection number handled by input line 31 connected to that store. The packet is handled octet by octet. The output address (in output buffers 47) for the first octet is accessed by store 43 in accordance with the connection number and this address is loaded into update buffer 41. The DAS 39 then transfers the first octet to the update buffer. Then, after incrementing the counter of store 43, the output address for the next octet is sent to buffer 41 and the DAS transfers the octet to the buffer. This procedure is repeated until disassembly of the packet is complete and the octets are held with their respective output addresses in the update buffer 41.

While the octets are being transferred from the input buffer 37, the PAD software held on the access nodes is given write access to the destination store 43. For each new connection and for each call completion the access software updates the store with the appropriate address information.

Figure 5:
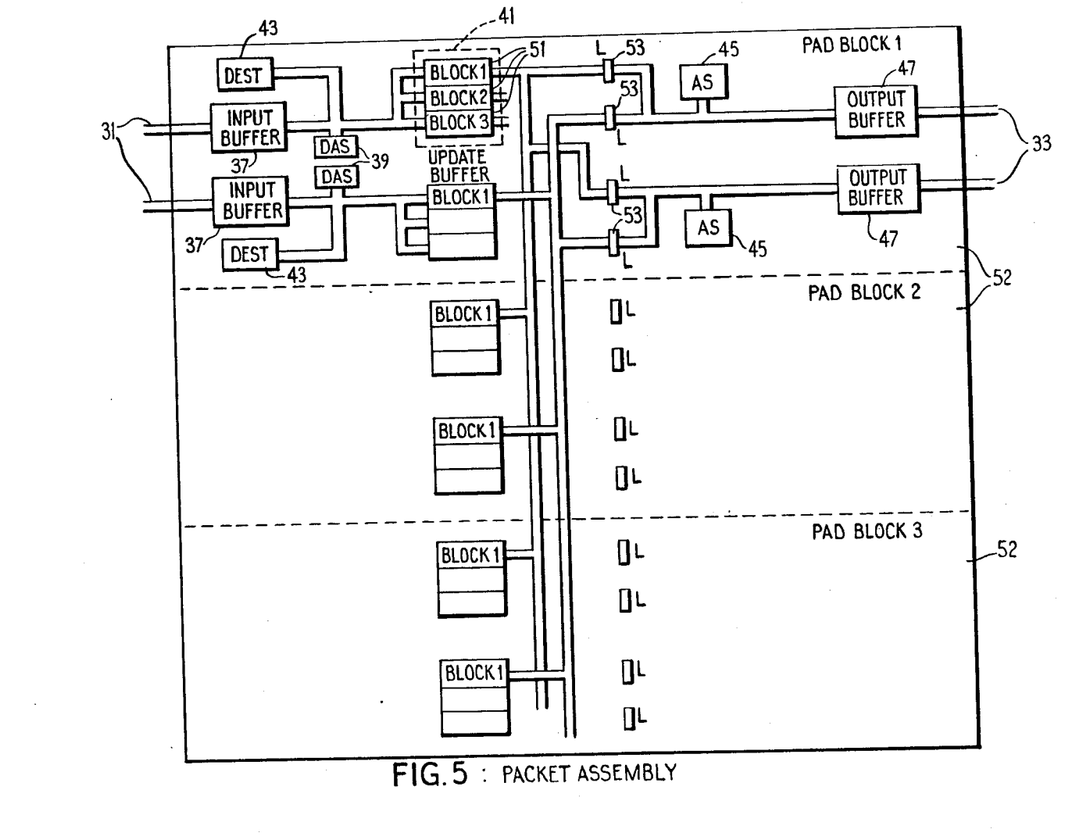

As shown in FIG. 5, the update buffers 41 are, in this example, partitioned into three blocks 51 so that a preliminary sort of updates may be made in accordance with the output addresses from DAS 39. PAD 25 is constructed in three corresponding blocks 52. Each output buffer 47 holds packets with connection numbers assigned to that buffer and each block 51 holds octets for a specific pair of output buffers. Each update buffer 41 has three blocks 51, so each block 51 holds octets for the output buffers 47 in the corresponding block 52 of PAD 25.

The re-assembly of packets is conducted under the control of AS 45. As shown in FIG. 5, the first block 51 of the top update buffer 41 is connected via address-/data buses to two latches 53 each connected to a different AS 45 and a corresponding output buffer 47 in the upper block 52 of PAD 25. The first block 51 of the second update buffer is similarly connected to a second pair of latches 53 and thence to the two AS's 45 and output buffers 47 in the upper block 52 of the PAD. The connections shown for the upper blocks of buffers 41 and the upper block of PAD 25 are repeated for the other blocks of buffers in the PAD, so that each block 51 of an update buffer 41 is connected to two latches 53, two ASs 45 and two buffers 47 in the corresponding block 52 of the PAD.

Latches 53 are loaded with updates from their update buffer blocks 51 under the control of the associated AS 45. Each AS 45 controls two latches, each served by three update buffer blocks 52 and it polls the latches looking for a valid address for its particular output buffer 47. If it finds a valid address it loads the buffer 47 with the update. The latch is then placed in input mode so that a new update can be loaded.

Since each update is loaded into two latches, once a valid address has been loaded into the appropriate buffer 47 from one latch, the other latch of the pair (associated with the second AS in the block) holds redundant information; both latches therefore need to be loaded with a new update. The AS which has performed the loading of buffer 47 places both latches in input mode to receive the next update from buffers 41. It will be noted that this arrangement allows for parallel processing of updates. Packets are assembled in the output buffers and a clock signal every 125 microseconds allows for release of one complete packet on each output line 33 every 125 microsecond period.

Figure 6:
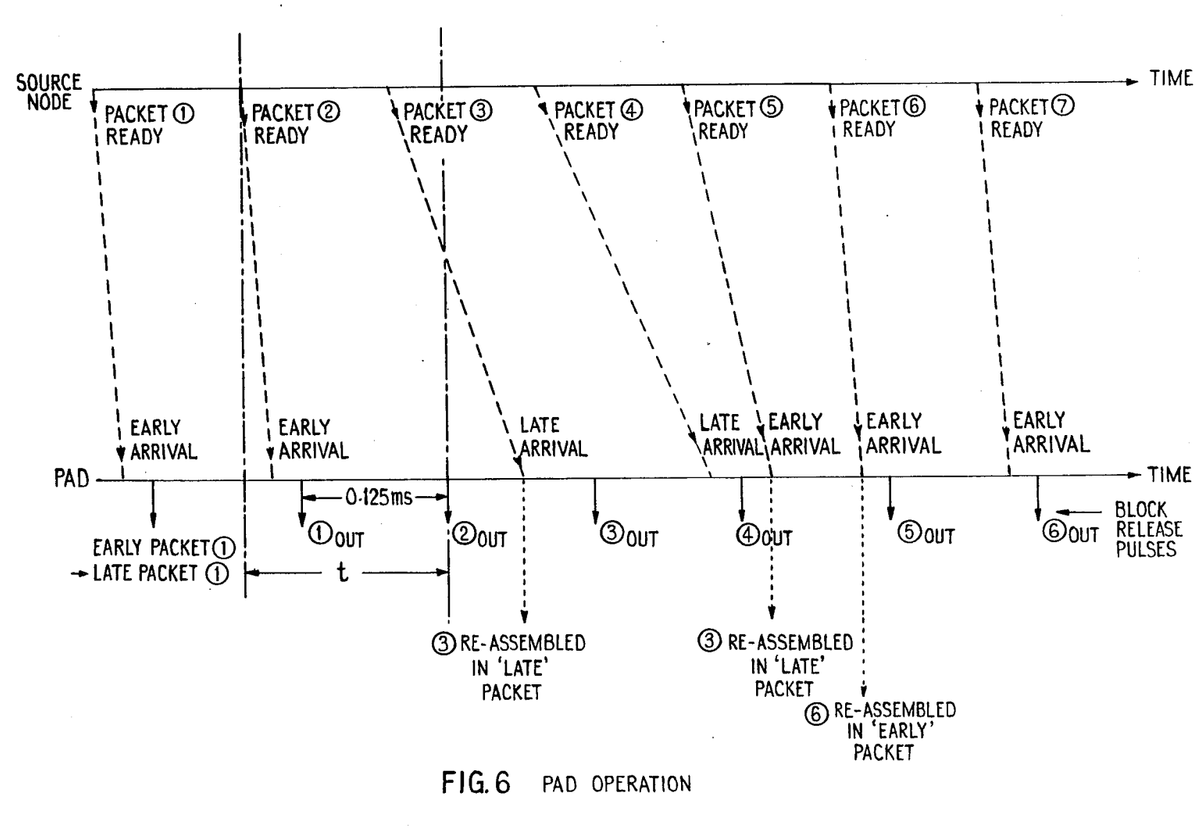
FIG. 6 indicates the operation of the PAD.

A source node can assemble a composite packet ready for transmission to one of the access nodes A, B every 125 microseconds. FIG. 6 illustrates the position at a given source node, where packets are ready at regular 125 microsecond intervals, but have to wait a variable period of up to 125 microseconds to gain access. PAD 25 has to be able to handle varying delays, and send packets out every 125 microseconds on receipt of a clock pulse.

In order to handle the spread of arrival times, each output buffer 47 is divided into two RAM areas, and each of these is further subdivided into two zones, one labelled 'early' and the other 'late'. When a new input packet sequence is set up the address location in the destination store 43 is automatically set on receipt of the first arriving packet to send updates for a particular outgoing packet to the 'early' zone on one of the two sides of the appropriate output buffer. The corresponding 'early' zone of the other side of that buffer will have 'read only' access until the next clock pulse. During this time packets which have been built in this area are released onto the ring.

The address location in the destination store 43 points to one of the four areas during disassembly of a packet, so octets are loaded into that area. After disassembly has been completed, the pointers in destination store 43 are automatically moved to point to the next area, i.e. they point in turn to each of the two zones on one side followed by each of the two zones on the other side. On receipt of the release clock pulse any pointer left pointing to the 'read only' area is automatically moved to point to the 'late' zone to be read after the next clock pulse. This ensures that missing packets do not cause octets to be lost in subsequent packets of the same sequence. On receipt of each clock pulse (occurring at regular 125 microsecond intervals), the designation of the two zones on each side is reversed, the 'early' zone becoming 'late'. The new 'late' zone can continue to accept octets which may have been delayed during the next 125 microseconds until the next clock pulse, when this zone then has 'read only' access and packets are released onto the ring. Octets from packets which arrive 'early' are asembled in 'early' zones and so are delayed at least 125 microseconds before being released after the zone has been converted to 'late'. Thus octets are reassembled in 'early' or 'late' packets as appropriate, to be released from the output buffer after an interval t (see FIG. 6) after the instant the corresponding composite packet was ready for release from the source node. Note that t will be between 125 and 250 microseconds, and since it exceeds the maximum time a packet takes to gain access to the ring, variations in the arrival times of different packets supplying octets for reassembly are absorbed.

The system described above has a number of advantages. As already pointed out, it can be used for public-switching of voice signals, as short delay limits can be achieved. Voice services only may be switched or alternatively a range of integrated services including data where the connection is typically as long as for voice. The system is flexible as new services can be added easily. As the network is extended and the number of nodes increased, the network may be serviced by one or more PADs, or PADs may be expanded. On a very small scale, a PAD may have a single input buffer and a single output buffer, but this number can be increased as necessary, adding an appropriate number of blocks.

A large trunk exchange typically handles 20,000 bothway erlangs, i.e. over 2,500 packets each servicing sixteen 64 kbit/sec speech channels are handled every 125 microseconds (the exact load depends on the efficiency with which packets are used). For such a large load, efficient use of packets can still be achieved using more than one PAD.

In large prior art networks where there may be, say, 50 nodes all having information to send to one another, a maximum of 50×49 packets could be required. Most of the packets would be very inefficiently used. In a similar system incorporating the present invention as described in the above embodiment, the 50 nodes might each need to issue only one packet, since each packet can contain data for several destination nodes. In addition, stringent delay requirements can be met; in the above example, delays in transferring an octet from a source node to a destination node would generally be less than about 500 microseconds.

In addition to nodes for handling standard packets of information, there may be specialised nodes for handling time division multiplexed pulse code modulated (PCM) signals. Such a node may have assess to a ring, for example, in a similar manner to other nodes. PCM signals received (for example from an exchange) are timed by the node into packets comprising a header with a connection number and a number of octets, suitably sixteen. Digital line termination equipment of standard form would also be required. Thus packets of information containing PCM signals can be handled by the PAD, and reassembled packets containing PCM data transmitted to appropriate nodes. Similarly, packets containing data for the PCM node have the header removed and the sixteen octets inserted in an outgoing PCM signal.

What is claimed is:

1. A communications network comprising:
   a plurality of nodes, each adapted to transmit and receive packets of information and
   at least one packet assembler and disassembler,
   wherein each of said nodes is adapted to assemble composite packets comprising information for calls for one or more destination nodes and to send the packets via the network to the packet assembler and disassembler
   and wherein the packet assembler and disassembler is adapted
   (a) to disassemble the composite packets without requiring packets to be received thereat in a predetermined order,
   (b) to reassemble information into composite packets of information for respective single nodes, and
   (c) to release those packets for transmission over the network to their destination nodes.

2. A communications network as claimed in claim 1, wherein restrictions are placed on the right of said nodes to transmit such that all nodes have the opportunity to transmit at least one packet in a fixed maximum period.

3. A network as claimed in claim 1 or claim 2, wherein each composite packet has a packet identifier and information for a call is assembled in a sequence of composite packets all having the same identifier and in the same location in each packet in the sequence, wherein the packet assembler and disassembler processes packets according to their identifiers, the information in the packets being handled according to its location in the packets.

4. A network as claimed in claim 3, wherein the packet assembler and disassembler comprises disassembly means and assembly means, and storage means to hold data on packet identifiers and the location of call information in a composite packet having a particular identifier.

5. A network as claimed in claim 4, wherein the packet assembler and disassembler is adapted to process a plurality of composite packets in parallel.

6. A network as claimed in claim 5, wherein the packet assembler and disassembler comprises a plurality of said disassembly means, assembly means and storage means.

7. A network as claimed in claim 1 or 2, wherein the packet assembler and disassembler can store information for an interval which is at least the maximum time likely to be taken for a packet from a node to gain access to the network.

8. A network as claimed in claim 1 or 2, having a plurality of packet assembler and disassemblers.

9. A network as claimed in claim 1 or 2, wherein at least some nodes are adapted to assemble composite packets to be sent to a packet assembler and disassembler and also to assemble packets of information for a single call addressed to the destination node for that call.

10. A network as claimed in claim 1 or 2, wherein at least some of said composite packets comprise information for two or more types of time-sensitive service.

11. A method of transmitting information between interconnected nodes in a communications network, comprising assembling at a node composite packets of information for calls for one or more nodes and sending the packets to a packet assembler and disassembler, via a network which may variably delay each packet, disassembling the information and reassembling in composite packets of information for a single node, and transmitting those packets via the network to their destinations.

12. A method as claimed in claim 11, wherein information for a call between two nodes is sent from the originating node in a sequence of composite packets all having an identifier and at a location in each packet which is the same for all packets in the sequence, and in the packet assembler and disassembler the packets are processed according to their identifier and information is handled according to its location in the packets.

13. A packet assembler and disassembler for processing packets of information transmitted from nodes in a communications network, comprising:
    input means for receiving composite packets containing information for calls for one or more destination nodes,
    disassembly means for disassembling the packets without requiring packets to be received thereat in a predetermined order,
    re-assembly means for re-assembling the information into packets containing information for a single destination node, and
    output means for releasing packets for transmission via the network to their respective destination nodes.

14. a multi-node digital communications network comprising:
    means for assembling digital information destined for different destination nodes into a composite packet and for sending such composite packet via said network to a predetermined node;
    means associated with said predetermined node for receiving said composite packets and reassembling said digital information into packets destined for single destination nodes and for transmitting such reassembled packets onto said network.

15. A method of communicating on a multi-node digital communications network, said method comprising:
    assembling digital information destined for different destination nodes into a composite packet;
    sending said composite packet via said network to a predetermined node;
    reassembling, via said predetermined node, said digital information into packets destined for single destination nodes; and
    sending said reassembled packets to said single destination nodes via said network.

* * * * *